July 31, 1923.
J. M. SELLERS
1,463,339
PROCESS OF BALLING SCRAP METAL
Filed April 3, 1922
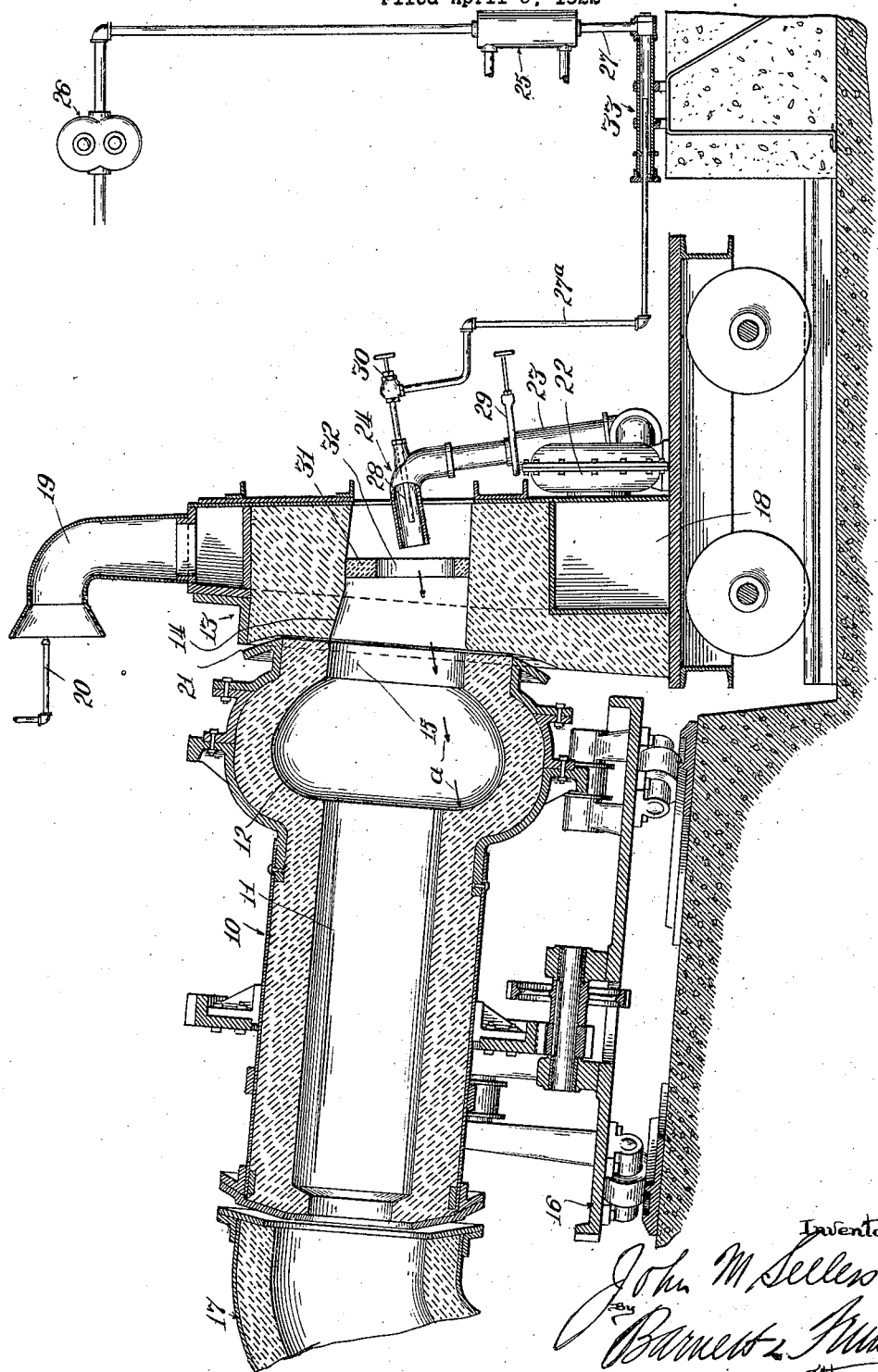
Inventor
John M Sellers
By Barnett & Tuman
Attorneys Patented July 31, 1923.

1,463,339

UNITED STATES PATENT OFFICE.

JOHN M. SELLERS, OF DOWNERS GROVE, ILLINOIS, ASSIGNOR TO SELLERS MANUFACTURING COMPANY, OF CHICAGO, ILLINOIS, A CORPORATION OF ILLINOIS.

PROCESS OF BALLING SCRAP METAL.

Application filed April 3, 1922. Serial No. 549,310.

*To all whom it may concern:*

Be it known that I, JOHN M. SELLERS, a citizen of the United States, residing at Downers Grove, in the county of Du Page and State of Illinois, have invented certain new and useful Improvements in Processes of Balling Scrap Metal, of which the following is a specification.

My invention relates to the production of a high grade wrought iron from iron and steel scrap, and its object is to improve upon the method of "balling" or welding the scrap into an agglomerated mass which is disclosed in the patent to David H. Lentz, No. 1,012,871 granted December 26, 1911, for "process of balling scrap metal"; this balling operation, so-called, being the initial step in the process of manufacturing the scrap metal into bars or billets of wrought iron.

In accordance with the method of the Lentz patent referred to, a charge of the scrap metal is introduced into a substantially cylindrical, rotary, pre-heating chamber which terminates at the end opposite to that into which the metal is introduced, in an enlarged, annular balling chamber. The pre-heating and balling chambers have the usual refractory lining. Heat is introduced into the balling chamber and from there into the preheating chamber through a flameway leading from a coal furnace with which the structure forming the balling and preheating chamber is aligned after the introduction of the charge into the preheating chamber. The charge of metal is preheated by the flame as it passes from the balling chamber and is fed into the balling chamber by rotation of this structure. The pieces of scrap heated and partially cleansed by agitation in the preheating chamber drop into the balling chamber where they are welded into a ball by rotation of the balling chamber, after which the rotary structure is turned away from the furnace and the ball removed. The hot plastic ball is then put through a squeezer to eliminate, so far as possible, slag and other impurities after which the body of metal is rolled or otherwise treated to convert the same into a billet or bar.

While this method has been successfully practiced on a large scale since the grant of the Lentz patent, I have discovered that, by making certain changes in this method improved results of a very important character are obtained, to-wit: a ball of softer and purer metal and one in which the welding of the constituents into a homogeneous mass is more complete, these characteristics facilitating and cheapening the subsequent operations of squeezing and rolling and giving a materially better quality of wrought iron; increased output for a given period of operation; reduction of fuel cost; and a very considerable saving in labor.

Certain of these improvements relate to the apparatus employed and these improvements are described and claimed in a copending application filed by me on April 2, 1922, Serial No. 556,891. Other improvements relate to the method of treating the metal during the balling operation and these improvements are the subject matter of my present invention.

In accordance with this invention, the ball, during the welding operation, and antecedently, the mass of scrap during the preheating step, instead of being heated by the products of combustion of a coal fire, are subjected to a clear, oxidizing flame of constantly uniform temperature produced by the combustion in the balling chamber itself of a suspended fuel, preferably atomized hydro-carbon oil, which is preferably preheated, mixed with preferably preheated air, preferably somewhat moistened, and burned during the welding operation, in immediate contact with the heated metal. The temperature produced in the balling and preheating chambers is increased over that obtainable by the old methods, the combustion of fuel is more complete, the flame freer of carbon, sulphur and other impurities likely to be carried into the metal, and the temperature is capable of being maintained constant during the whole treatment of the batch of scrap, which has been found to be impossible with the coal furnace employed in the Lentz method. To these considerations I attribute the improved results obtained. Whether this be the correct explanation or not, comparative analyses of the iron produced by the Lentz method and by the method herein described demonstrate that a purer, softer and better grade of wrought iron is produced when the latter method is used and practical experience with the subsequent handling of the ball in the squeezers and rolls fully confirms the analyses.

In the accompanying drawing I have shown, somewhat fragmentarily, an apparatus suitable for carrying out the improved process. It will be understood, however, that the process is not limited to the use of this particular apparatus, which I do not claim herein, as such apparatus forms the subject matter of my co-pending application above referred to.

The drawing shows a longitudinal sectional view of the apparatus concerned, with certain parts in elevation.

Referring to the drawing, 10 represents the balling furnace which is preferably slightly inclined from horizontal and is rotated by suitable mechanism on its longitudinal axis. 11 designates the preheating chamber which is substantially cylindrical in form, and 12 the annular balling chamber which is of larger diameter than the preheating chamber. 13 designates a structure having a flue or fuel opening 14 communicating with the opening 15 in the end of the balling chamber. The structure 13 is movable toward and away from the end of the balling furnace and the latter is mounted on a turn table 16 so that it may be turned out of alignment with flue 14 and with the discharge flue 17 at the other end of the furnace for the purpose of removing the finished ball and re-charging the furnace. The structure 13 is formed with an air duct 18 surrounding flue 14 into which air is introduced through a jet 19 into which projects the open end of a steam pipe 20. The jet is preferably arranged so that it takes in the heated air escaping from the space 21 between the balling furnace and the structure 13. The air, after being further heated in duct 18, is forced by a pump 22 into an air pipe 23 provided with a nozzle 24 which projects part way through the flue 14. The oil, after being heated, preferably, in the heater 25, is forced by pump 26 through a pipe 27, 27ª, provided with a nozzle 28 which extends into the air nozzle 24. 29 is a valve for controlling the air and 30 a controlling valve in the oil line. The air and oil nozzles are preferably formed as shown to spread the flame somewhat. If desired, two fuel nozzles may be employed. The general direction of the flame is against the further side of the balling chamber as indicated by the arrows a. The flue 14 may be provided with a transverse wall 31 arranged directly in front of the fuel nozzle and formed with an opening 32. In order to accommodate the forward and back movements of structure 13 a telescoping device 33 is interposed between the oil pipe sections 27 and 27ª.

After the metal has been charged into the upper or left hand end of the preheating chamber, the balling furnace is turned so that it aligns with the flue 14 and the discharge flue 17 and is then rotated, preferably at intervals, so as to turn over the charge of scrap and eventually bring it in a highly heated but unmelted condition into the balling chamber 12. I mean by this that the pieces of scrap are not reduced to a molten state although they may be melted to a certain extent superficially. In the balling chamber it is subjected to the very high temperature produced by the combustion of atomized oil which is mixed with air in correct proportions accurately obtained by adjustment of valves 29, 30, this combustion taking place in the balling chamber itself. Owing to the preheating of the charge before reaching the balling chamber, there is no tendency to deposit carbon when the fuel spray contacts with the metal charge, but the highly heated charge and the highly heated refractory lining of the balling chamber facilitate the complete combustion of the fuel spray, and produce such combustion at a temperature which produces the results sought, and permits the use of a maximum of oxygen in the fuel spray. The flame produced is a clear, oxidizing flame and it effectively burns away many of the undesirable impurities in the metal treated.

Owing to the complete combustion, and quick production of the maximum temperature desired, the ball is formed so rapidly that there is a great reduction of furnace loss of metal, as compared with the best results attained by any former practice.

I have found, by the analyses referred to, that a ball produced in this way is softer, more homogeneous and will hold its heat longer than balls made by the Lentz process. The fact that the ball will hold its heat longer is important as it facilitates and makes more effective the operation of "squeezing", the purpose of which is to further weld the constituents of the mass to each other and press out the slag and other impurities.

Furthermore, the analyses above referred to demonstrate that the iron made from a ball formed in accordance with my improvement contains less carbon, manganese, phosphorous and sulphur than iron made in accordance with the Lentz method. The comparative analyses show generally speaking, a wrought iron having approximately twenty-five per cent greater purity. The results of these analyses are fully confirmed by experience with the balls during the later steps in the process. It has been made quite obvious to those handling the metal in the squeezers and rolls that the metal is softer and purer. It is worked more easily. The flame to which the metal is subjected is not only a purer flame than is obtainable by the former method, and its temperature higher, but it is more constant with respect to these characteristics. With the balling methods heretofore used a slowing down of the fire was inevitable during the periods when the balling furnace was being charged with metal and also during the unavoidable recoaling of the fire which would frequently happen in the midst of operations. Furthermore, with the Lentz process it is necessary twice in every working turn to stop all operations, draw the fire, clean the grate of the furnace and start a new fire to maintain the necessary temperature conditions for balling. Between these times the quality and temperature of the flame are constantly changing. As a result the cold metal charged into the preheating chamber was subjected at first to a relatively low temperature flame which was likely to be quite smoky.

Furthermore, by my improved process, I increase output over the Lentz process because I am enabled to produce each ball in a much shorter period of treatment and thereby make a considerable saving in the cost of fuel per ton of iron produced.

Over a considerable period of constant operation the production per hour of operation with the same balling machine is 60 per cent greater with my new process than with the described Lentz process, but owing to the uninterrupted efficient operations for reasons previously noted, the output per day is increased over 100 per cent.

In the matter of labor, I operate my process with only four of the seven men required per machine with the Lentz process.

In carrying out the method I prefer to use air at a pressure of approximately three ounces per square inch and to preheat the air of the fuel charge to a temperature of approximately 120° Fahrenheit. The oil is injected at a pressure of about 130 pounds per square inch and is preheated to a temperature of about 180° Fahrenheit. It will be realized, however, that these temperatures and pressures will be varied according to the particular apparatus employed and the character of the material treated, quality of fuel oil used, temperature desired, and other conditions of like character.

The hydrocarbon oil or other carbon bearing fuel flow and air flow, to form the fuel spray, should of course be so adjusted as to produce the best results as to complete combustion and high resulting temperature.

While a slag or "cinder" bath is desirable to get best results in forming the ball, excessive or old cinder may be tapped off from time to time by driving a tap hole in the periphery of the balling chamber. Such hole can be plugged in any familiar manner such as with a short bar of iron, which can be driven in later when desired to again tap the chamber.

In operation it will be observed that the fuel in suspension is in the form of a forced spray of carbon and oxygen bearing elements, such as fuel-oil and air, which may be controllably and properly proportioned to insure complete combustion at a very high temperature.

During the preliminary heating of the chamber the fuel element proportions may be varied as may be necessary to obtain perfect combustion under these preliminary conditions.

The combustion of fuel quickly raises the refractory lining in the balling chamber to a white heat and the escaping heat serves more slowly to likewise bring the refractory lining of the preheating chamber to a high temperature.

Then the preheating chamber is charged with a charge of scrap in relatively small pieces, which by the rotation of the apparatus becomes spread in a thin layer over the heated lining of the preheating chamber, the pieces of scrap being turned over by further rotation and gradually conveyed thereby to the balling chamber.

The speed of rotation is preferably so controlled that the particles of scrap drop into the balling chamber where is the zone of the most intense heat, when they have been heated to such an extent that they will readily weld into a ball in the balling chamber.

As the preheated pieces of scrap drop into the balling chamber, the fuel spray impinges on the scrap.

Owing to the highly heated condition of the scrap, there is no tendency to precipitate or separate any of the suspended fuel elements. On the contrary, the heated scrap facilitates the formation and complete combustion of highly combustible gases from the fuel spray which burn without visible flame or smoke.

Thereby I attain:

Substantially perfect combustion and resulting economy of fuel.

A maximum temperature whereby the charge is heated and the ball formed much more rapidly, thereby increasing the output per machine over 100 per cent.

A quickly and more complete oxidation of carbon and other impurities in the charge, thereby producing not only a purer iron, but a softer and hotter ball which can be more quickly and economically worked.

A complete combustion whereby precipitation on the charge of unconsumed fuel elements or products of combustion is avoided.

A uniformity of temperature, whereby a more regular cycle of operation may be followed, producing higher output, and particularly a uniformity in quality of output not previously attainable.

I claim:

1. Method of manufacturing wrought iron from metal scrap which comprises preheating the scrap without reducing it to a molten state and then collecting a charge of the preheated scrap and balling it by rolling, while subjected to a high temperature produced by the combustion of a fuel in suspension in immediate contact with such metal in the space in which the metal is balled.

2. Method of manufacturing wrought iron from metal scrap which comprises preheating the scrap without reducing it to a molten state, and then collecting a charge of the preheated metal and balling it by rolling, while subjected to a high temperature produced by the combustion of a finely divided preheated fuel introduced with a preheated oxygen bearing element and burned in suspension in immediate contact with the metal charge in the space in which the metal is balled.

3. Method of manufacturing wrought iron from metal scrap which comprises preheating the scrap without reducing it to a molten state, and then collecting a charge of the preheated metal and balling it by rolling, while subjected to a high temperature produced by the combustion of a fluid fuel introduced into and burned in suspension in the space in which the metal is balled in immediate contact with such metal.

4. Method of manufacturing wrought iron from scrap which comprises subjecting the scrap while spread out over an extended surface to a flame to preheat it without reducing it to a molten state, then collecting a charge of the metal and balling it by rolling while subjected to a higher temperature than the preheating temperature produced by the combustion of a fluid fuel introduced into and burned in suspension in the space in which the metal is balled in immediate contact with such metal.

5. Method of manufacturing wrought iron from scrap metal which comprises preheating the scrap without reducing it to a molten state, and then collecting a charge of the preheated metal and balling it by rolling while subjected to a high temperature produced by the combustion of a hydrocarbon oil introduced in an atomized condition into and burned in suspension in the space in which the metal is balled.

6. Method of manufacturing wrought iron from scrap metal which comprises subjecting the scrap while spread out over an extended surface to a flame to preheat it without reducing it to a molten state, then collecting a charge of the metal and balling it by rolling while subjected to a higher temperature than the preheating temperature produced by the combustion of a hydrocarbon oil introduced in atomized condition into and burned in suspension in the space in which the metal is balled.

7. Method of manufacturing wrought iron from scrap which comprises preheating the scrap without reducing it to a molten condition and then collecting a charge of the preheated metal and balling it by rolling while subjected to a high temperature produced by the combustion of a preheated hydrocarbon oil introduced in atomized condition with preheated air and moisture into and burned in suspension in the space in which the metal is balled.

8. Method of balling scrap metal which consists in causing the metal to pass while spread out and subjected to agitation through a preheating zone into a balling space and there collecting and rolling the preheated metal into a ball, and producing a welding heat in the balling space, and a lower degree of heat in the preheating zone, which latter heats without melting the metal in said preheating zone, by the combustion in the balling space of a hydrocarbon oil and the conduction of the flames from the balling space through the preheating zone.

9. Method of balling scrap metal which consists in causing the metal to pass while spread out and subjected to agitation through a preheating zone into a balling space and there collecting and rolling the preheated metal into a ball, and producing a welding heat in the balling space, and a lower degree of heat in the preheating zone, which latter heats without melting the metal in said preheating zone, by the combustion in the balling space of a suspended finely divided fuel and the conduction of the flames from the balling space through the preheating zone.

JOHN M. SELLERS.